United States Patent
Reese, III

(10) Patent No.: US 11,944,856 B1
(45) Date of Patent: Apr. 2, 2024

(54) EXTERIOR FIRE SUPPRESSION SYSTEM

(71) Applicant: John E. Reese, III, Charleston, SC (US)

(72) Inventor: John E. Reese, III, Charleston, SC (US)

( * ) Notice: Subject to any disclaimer, the term of this patent is extended or adjusted under 35 U.S.C. 154(b) by 149 days.

(21) Appl. No.: 17/458,766

(22) Filed: Aug. 27, 2021

Related U.S. Application Data

(63) Continuation of application No. 16/518,898, filed on Jul. 22, 2019, now abandoned.

(60) Provisional application No. 62/701,247, filed on Jul. 20, 2018.

(51) Int. Cl.
*A62C 37/44* (2006.01)
*A62C 37/36* (2006.01)
*G01K 1/024* (2021.01)
*G01K 3/00* (2006.01)
*G01K 13/00* (2021.01)

(52) U.S. Cl.
CPC ............. *A62C 37/44* (2013.01); *A62C 37/04* (2013.01); *G01K 1/024* (2013.01); *G01K 3/005* (2013.01); *G01K 13/00* (2013.01)

(58) Field of Classification Search
CPC ........ A62C 37/44; A62C 37/04; G01K 1/024; G01K 3/005; G01K 13/00
USPC ......................................................... 169/61
See application file for complete search history.

(56) References Cited

U.S. PATENT DOCUMENTS

| | | | | |
|---|---|---|---|---|
| 4,091,874 A | * | 5/1978 | Monma | A62C 99/0018 169/46 |
| 4,227,577 A | * | 10/1980 | Lida | A62C 37/00 169/46 |
| 4,272,414 A | * | 6/1981 | Vandersall | C09K 21/04 106/14.12 |
| 4,330,040 A | * | 5/1982 | Ence | A62C 3/00 169/13 |
| 4,428,434 A | * | 1/1984 | Gelaude | A62C 3/00 137/624.11 |
| 4,836,290 A | * | 6/1989 | Le Lande, Jr. | A62C 35/62 169/11 |
| 2006/0076430 A1 | * | 4/2006 | Lee | B64D 41/00 239/10 |

* cited by examiner

*Primary Examiner* — Chee-Chong Lee
(74) *Attorney, Agent, or Firm* — Gregory Finch; Finch Paolino, LLC

(57) ABSTRACT

An exterior fire suppression system that includes: a conduit line providing pressurized flow of a fire-suppressing material; a plurality of variable flow spray nozzles coupled to the conduit line and operable to disperse a variable spray of the fire-suppressing material onto the exterior of the building; a pump; a reservoir tank in fluid communication with the pump and the conduit line, the reservoir tank configured to store the fire-suppressing material; a control system operable to control a flow of the fire-suppressing material from the reservoir tank, the pressurized flow of the fire-suppressing material through the conduit line via the pump, and the dispersion of the fire-suppressing material through the plurality of variable flow spray nozzles; and a power supply operably connected to provide electric power to the pump and the control system.

11 Claims, 3 Drawing Sheets

EXTERIOR FIRE SUPPRESSION SYSTEM

CROSS-REFERENCE TO RELATED APPLICATIONS

This application is a continuation of U.S. application Ser. No. 16/518,898 filed Jul. 22, 2019, which claims the benefit of U.S. Provisional Application No. 62/701,247 filed on Jul. 20, 2018, the disclosure of which is hereby incorporated by reference herein in its entirety.

TECHNICAL FIELD

The present invention relates to fire suppression, and more particularly to an exterior fire suppression system for buildings.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

An object of the present invention is an exterior fire suppression system comprising: a conduit line configured to transport a pressurized flow of water, the conduit line configured to be attached to an exterior of a building and positioned at a perimeter of the building at a predetermined distance from the exterior of the building, or directly adhered to the building; a plurality of variable flow spray nozzles coupled to the conduit line, the plurality of variable flow spray nozzles operable to disperse a variable spray of fire-suppressing material onto the exterior of the building; a pump; a reservoir tank in fluid communication with the pump and the conduit line; a control system operable to control the pressurized flow of water through the conduit line via the pump and the variable spray of water, and a power supply operably connected to provide power to the pump and the control system. The power supply may preferably comprise a primary power source and a secondary (backup) power source.

In embodiments, the fire-suppressing material is water or another suitable fire-suppressing material, including without limitation, gaseous agents such as carbon dioxide, wet or dry chemical fire-suppressing agents, and foam-generating liquids. The fire-suppressing material may be dispersed by the plurality of variable flow spray nozzles in a form selected from the group consisting of liquid, gas, vapor, and foam.

In embodiments of the invention, the fire suppression system further comprises one or more thermal indicators coupled to the power supply, wherein the one or more thermal indicators are configured to detect a presence of fire and to transmit a signal to the control system indicating the presence of fire. In response to the signal from the one or more thermal indicators indicating the presence of fire, the control system is configured to cause the fire-suppressing material to be fed into the conduit line via the pump and dispersed through the variable flow spray nozzles attached thereto.

Also provided is a computer-readable medium on which is encoded an executable program code for suppressing a fire, the executable program code comprising: instructions for receiving the signal from the one or more thermal indicators indicating the presence of a fire; and instructions for causing the fire-suppressing material to be transferred into the conduit for dispersion by the plurality of variable spray nozzles in response to receiving the signal from the one or more thermal indicators.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The above and other objects, features and advantages of the present disclosure will be more apparent from the following detailed description taken in conjunction with the accompanying drawings, in which.

DETAILED DESCRIPTION

Figure 1:
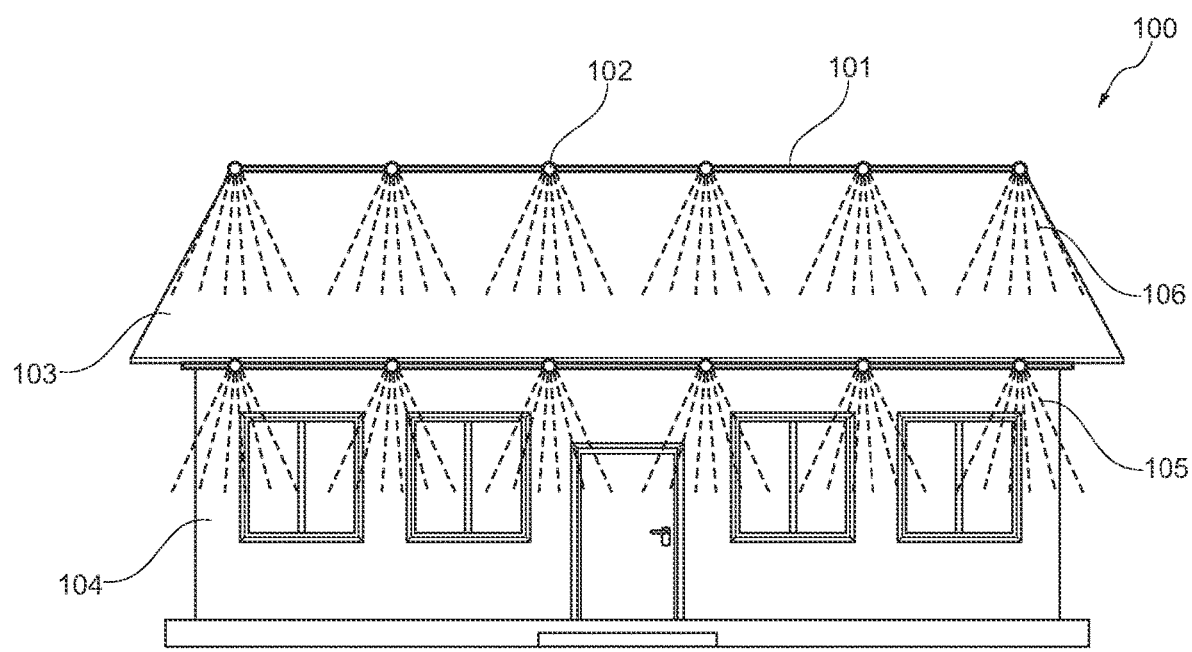
FIG. 1 is an elevation view of an exterior fire suppression system, according to an embodiment.

Exemplary embodiments are described herein to provide a detailed description of the present disclosure. Variations of these embodiments will be apparent to those of skill in the art. Moreover, certain terminology is used in the following description for convenience only and is not limiting. For example, the words "right," "left," "top," "bottom," "upper," "lower," "inner" and "outer" designate directions in the drawings to which reference is made. The word "a" is defined to mean "at least one." The terminology includes the words above specifically mentioned, derivatives thereof, and words of similar import.

Although the system is described herein for residential applications, it is understood that the system may be configured for any structure known in the art, including but not limited to agricultural, commercial, educational, and industrial buildings as well as power plants and transportation structures, such as bridges.

Referring to FIG. 1, an elevation view of an exterior fire suppression system 100 is illustrated. The fire suppression system comprises a plurality of fire protection devices or "curtains" of directional water flow configured to be installed on an exterior of a building, such as a residential home. In an embodiment, the fire protection curtains are configured to attach to the exterior of the building at multiple locations, depending on the size and shape of the building, as well as the building location in terms of possible encroachment by external fires.

For instance, in FIG. 1, the fire protection curtains are attached to roof 103 and exterior wall 104 or façade of the building. Preferably, the protection curtains are attached to a top portion of the roof, and a top portion of the exterior wall. This is critical during operation, as the water spray is released in a downward direction (like a "curtain" of water).

In an embodiment, the fire protection curtains are comprised of a conduit line 101 and a plurality of variable flow spray nozzles 102 positioned along and coupled to the conduit line. In embodiments, the conduit line is configured to transport a pressurized flow of water and each spray nozzle is configured to provide a variable spray of the pressurized water 105/106, including but not limited to spray, mist, and fog. The specific form of the pressurized is selected based on the hazard or threat condition present. Preferably, each spray nozzle of the plurality of variable flow spray nozzles is spaced adequately along the conduit line such that the variable spray of pressurized water is configured to reach all the exterior surfaces of the building. In some embodiments, the plurality of variable spray nozzles may be concentrated at specific locations of the building that are deemed most "at risk" for encroachment by external fire. In still other embodiments, the pressurized water may be selectively directed or restricted to specific variable flow spray nozzles, depending on location of greatest threat by fire, by the control system.

According to embodiments of the invention, the fire suppression system provides a variable spray of pressurized fire-suppressing material, such as water in the form of "curtains" as discussed above. Alternatively, the fire suppression system may deliver and disperse any other desirable fire-suppressing material(s), such as chemical compounds, compositions, or liquids having foaming properties. Specifically, the system according to the invention may be configured to deliver and disperse fire suppression materials suitable for dry chemical fire suppression or wet chemical fire suppression. For example, in some embodiments of the invention, the conduit feeds and the plurality of variable spray nozzles produce vapor suppression foam, which is particularly effective in preventing re-ignition in the case of fire. In some embodiments, the conduit may feed an agent that, when dispersed by the plurality of variable spray nozzles, absorb heat and lower a fire's temperature below the ignition point. In some embodiments, the fire suppression material dispersed by the variable spray nozzles may be a gaseous agent such as carbon dioxide that extinguishes flames by displacing oxygen. In still other embodiments, wet fire suppression chemicals may be used, which upon dispersion by the variable spray nozzles suppress the fire, blanket the flames, and prevent the fire from reigniting.

Figure 2:
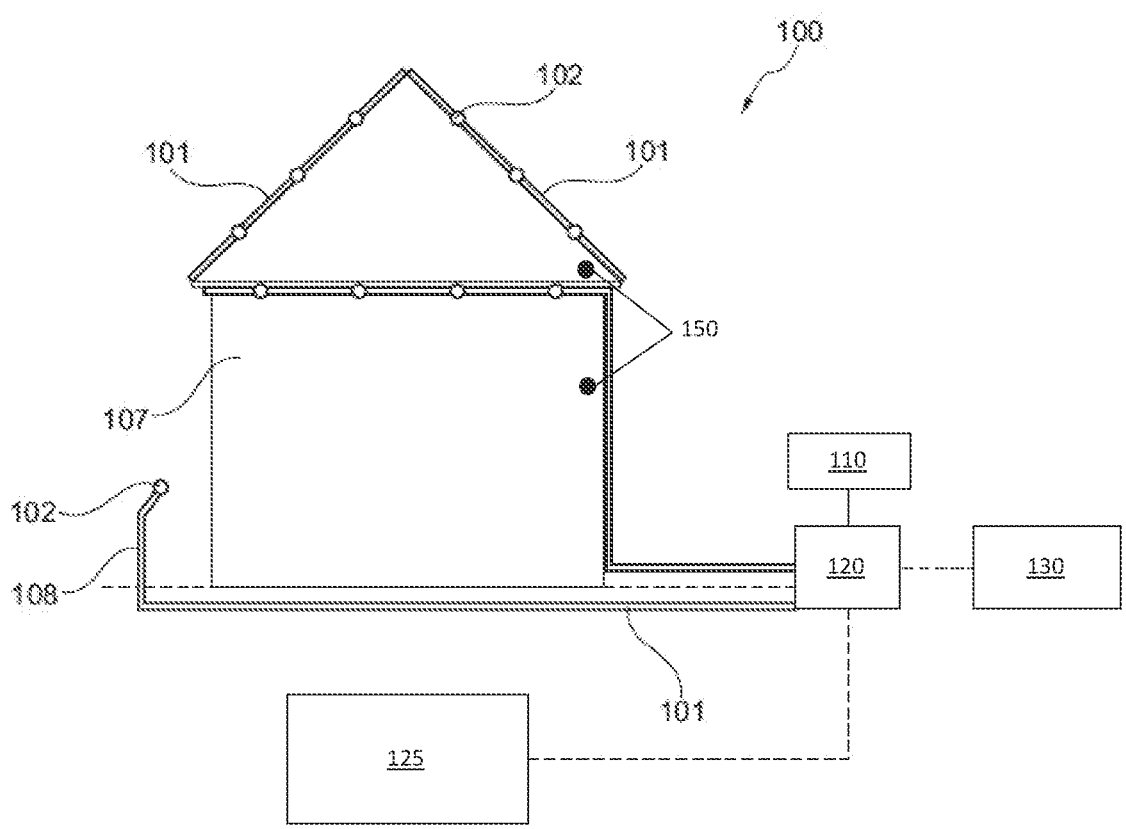
FIG. 2 is a diagram of an exterior fire suppression system, according to an embodiment; and, FIG. 3 is a detailed view of fire protection curtains along a perimeter of a building, according to an embodiment.

Referring to FIG. 2, a diagram of an exterior fire suppression system 100 is illustrated. As previously mentioned, the exterior fire suppression system comprises a conduit line 101 configured to attach to the exterior of a building 107, the conduit line having a plurality of variable flow spray nozzles 102 configured to provide a variable spray of pressurized water. In an embodiment, the conduit line may be positioned at a distance from the exterior surfaces of the building such that a plurality of variable flow spray nozzles is configured to project a variable spray onto the exterior of the building. The angle of each spray nozzle of the plurality of variable flow spray nozzles may be adjusted to reach all surfaces areas of the exterior of the building, either at installation or remotely by instruction received from the control system. As shown in FIG. 2, risers 108 may also be provided to disperse the variable spray of pressurized water or chemical compounds at a predetermined height above the conduit line level.

Still referring to FIG. 2, the exterior fire suppression system 100 further comprises a control system 110, a pump 120, a reservoir tank 125, and a power supply 130, which may include a primary and a secondary or backup power source (not shown). The control system 110 is configured to control all aspects of the exterior fire suppression system 100 according to the present invention. In an embodiment, the control system 110 is configured to control the variable spray of fire-suppressing material (e.g., pressurized water and/or chemical agents, compound(s), gasses, or foam-forming liquids), the form of the dispersed fire-suppressing material (e.g., liquid spray, mist, fog, foam), the pressure of the flow of dispersed fire-suppressing material (high or low pressure), location(s) of the variable spray if concentration is desired at a particular location, and any programmed, pre-set, or timing conditions for initiating the variable spray of the system.

In embodiments, the control system comprises a computer-readable medium on which is encoded executable program code for suppressing a fire, the program code comprising: program code for receiving a signal from the thermal indicator indicating the presence of a fire; and program code for causing a fire suppression material to be transferred into the conduit for dispersion by the plurality of variable spray nozzles in response to receiving the signal.

The specific spray of the system may vary depending on the location of each spray nozzle as well as the hazard or threat condition. In an embodiment, periodical testing of the system may be programmed via the control system. Water sprayed during such periodical testing may be repurposed as a lawn watering solution.

In an embodiment, one or more temperature sensors or thermal indicators (hereinafter "thermal indicators") 150 are provided on the building, either on external surfaces and/or in the interior of the building. The thermal indicators 150 are operably connected so as to be in communication, preferably wireless communication, with the control system 110. The one or more thermal indicators 150 are configured to send a signal to the control system 110, for example, when a predetermined temperature is reached, indicating a potential hazard or threat condition, such as a fire is present. In embodiments, the one or more temperature sensors or thermal indicators 150 are coupled to a power supply 130 and operable to (a) detect presence of a fire, and (b) transmit a signal to the control system 110 indicating the presence of fire. In response to the signal transmitted by the one or more thermal indicators 150, the control system 110, which is also coupled or operably connected to the power supply 130, activates the system 100 by turning on the pump 120, wherein the pump is configured to pump the fire-suppressing material from the reservoir tank 125 through the conduit lines 101 for dispersion.

In an embodiment, the reservoir tank is configured to store water, including city water, well water, rain water, or a combination thereof. If rain water is stored, a rain water collection system (not illustrated) may be used to capture the rain water, as well known in the art. In alternate embodiments, the reservoir tank is not necessarily a water reservoir tank, but is configured to store any suitable fire-suppressing material.

The pump and control system are powered via a power supply, which preferably comprises a primary power source (supplied electricity from the city) and a backup power source when the primary power is unavailable. In an embodiment, the backup power source may be solar panels, a stand-by generator, or a combination thereof. Any stand-by generator may be used, such as duel propane or natural gas fueled generator.

Figure 3:
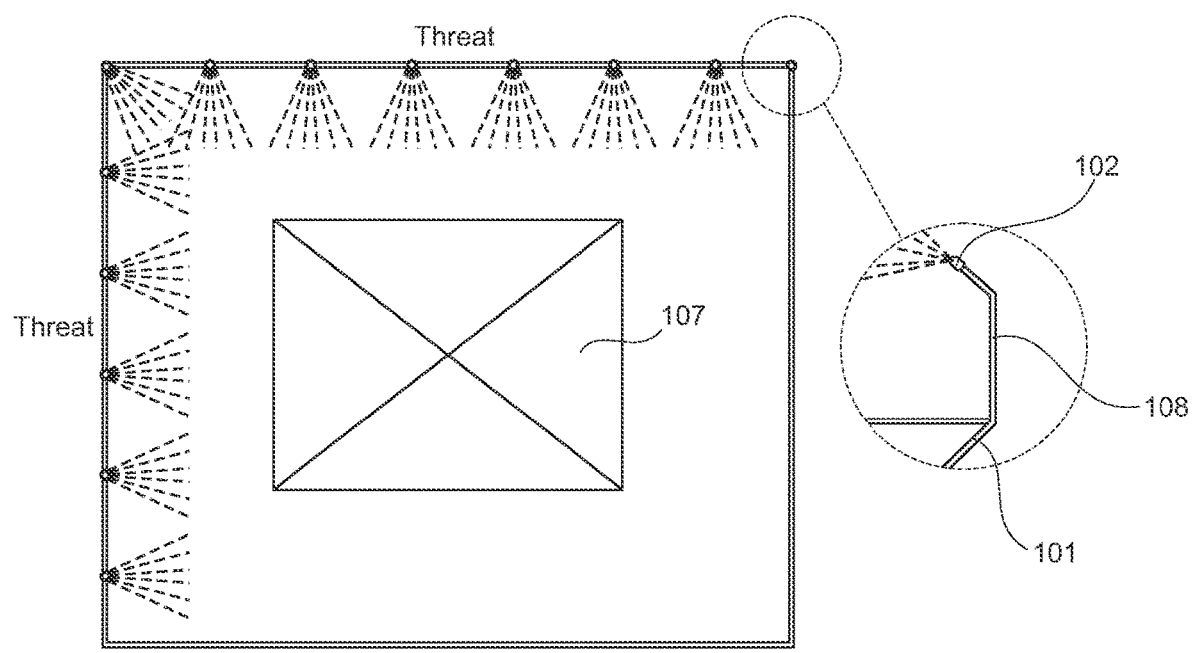

Illustrated in FIG. 3 is a detailed view of the fire protection curtains along a perimeter of a building 107. In an embodiment, the conduit line may be positioned at a distance from the exterior surfaces of the building along the perimeter such that a plurality of variable flow spray nozzles 102 is configured to project a variable spray onto the exterior of the building. By positioning the fire protection curtains along the perimeter, complete fire protection coverage of the building is provided. As previously discussed, the perimeter fire protection curtains include a conduit line 101, risers 108, and a plurality of variable flow spray nozzles 102. The exterior fire suppression system provides an affordable solution against fire threats and hazards, preferably configured for residential applications providing peace of mind for residents, increased property resale values, and potential insurance reductions. In an embodiment, the exterior fire suppression system may be used for insulation and cooling, particularly during extreme high heat weather conditions. For instance, the exterior fire suppression system may be used to cool ambient conditions providing a temperature difference of approximately 30 degrees Fahrenheit resulting in reduced power consumption and air conditioning requirements.

What is claimed is:

1. An exterior fire suppression system comprising:
a conduit line configured to transport a pressurized flow of a fire-suppressing material, wherein the conduit line is configured to be attached to an exterior of a building;
a plurality of variable flow spray nozzles coupled to the conduit line, the plurality of variable flow spray nozzles being operable to disperse a variable spray of the fire-suppressing material onto the exterior of the building;
a pump;
a reservoir tank in fluid communication with the pump and the conduit line, the reservoir tank being configured to store the fire-suppressing material;
a control system operable to control a flow of the fire-suppressing material from the reservoir tank, the pressurized flow of the fire-suppressing material through the conduit line via the pump, and the dispersion of the fire-suppressing material through the plurality of variable flow spray nozzles;
a power supply operably connected to provide electric power to the pump and the control system; and
one or more thermal indicators coupled to the power supply, wherein the one or more thermal indicators are configured to detect a presence of fire and to transmit a signal to the control system indicating the presence of a fire,
wherein the control system comprises a computer-readable medium on which is encoded an executable program code that, when executed, commands one or more operations of the control system, the one or more operations comprising:
receiving the signal from the one or more thermal indicators indicating the presence of the fire;
causing the fire-suppressing material to be transferred into the conduit line for dispersion by the plurality of variable flow spray nozzles in response to receiving the signal from the one or more thermal indicators;
controlling a variable pressure of the fire-suppressing material at the plurality of variable flow spray nozzles; and
selectively controlling an output of the fire-suppressing material at one or more variable flow spray nozzle in the plurality of variable flow spray nozzles such that a greater concentration of the fire-suppressing material may be delivered to a specified location of the exterior of the building relative to other locations of the exterior of the building.

2. The exterior fire suppression system of claim 1, wherein the fire-suppressing material is water.

3. The exterior fire suppression system of claim 1, wherein the fire-suppressing material is a gaseous agent.

4. The exterior fire suppression system of claim 3, wherein the fire-suppressing material is carbon dioxide.

5. The exterior fire suppression system of claim 1, wherein the fire-suppressing material is a wet chemical agent.

6. The exterior fire suppression system of claim 1, wherein the fire-suppressing material is a dry chemical agent.

7. The exterior fire suppression system of claim 1, wherein the fire-suppressing material is a foam-generating liquid.

8. The exterior fire suppression system of claim 1, wherein in response to the signal from the one or more thermal indicators indicating the presence of the fire, the control system is configured to cause the fire-suppressing material to be fed into the conduit line via the pump and dispersed through the variable flow spray nozzles attached thereto.

9. The exterior fire suppression system of claim 8, wherein the reservoir tank is a water reservoir tank and the fire-suppressing material is water.

10. The exterior fire suppression system of claim 8, wherein the fire-suppressing material dispersed by the plurality of variable flow spray nozzles is in a form selected from the group consisting of liquid, gas, vapor, and foam.

11. The exterior fire suppression system of claim 1, wherein the power supply comprises a primary power source and a secondary power source.

* * * * *